US008558886B1

(12) United States Patent
Borjas

(10) Patent No.: US 8,558,886 B1
(45) Date of Patent: Oct. 15, 2013

(54) VIDEO COLLECTION FOR A WIRELESS COMMUNICATION SYSTEM

(75) Inventor: John Charles Borjas, Loveland, OH (US)

(73) Assignee: Sprint Communications Company L.P., Overland Park, KS (US)

( * ) Notice: Subject to any disclaimer, the term of this patent is extended or adjusted under 35 U.S.C. 154(b) by 2034 days.

(21) Appl. No.: 11/625,134

(22) Filed: Jan. 19, 2007

(51) Int. Cl.
*H04N 7/18* (2006.01)

(52) U.S. Cl.
USPC .................. 348/143; 348/61; 396/56; 396/58

(58) Field of Classification Search
None
See application file for complete search history.

(56) References Cited

U.S. PATENT DOCUMENTS

| | | | |
|---|---|---|---|
| 2002/0167587 A1* | 11/2002 | Ogasawara | 348/89 |
| 2004/0160317 A1* | 8/2004 | McKeown et al. | 340/522 |
| 2004/0169587 A1* | 9/2004 | Washington | 340/573.1 |
| 2005/0104730 A1* | 5/2005 | Yang | 340/569 |
| 2006/0017809 A1* | 1/2006 | Carroll | 348/158 |
| 2006/0081343 A1* | 4/2006 | Clark et al. | 160/218 |
| 2007/0029726 A1* | 2/2007 | Ohira | 273/145 R |
| 2007/0201862 A1* | 8/2007 | Van Schaik et al. | 396/427 |
| 2008/0007620 A1* | 1/2008 | Wang et al. | 348/154 |

OTHER PUBLICATIONS

Federal Highway Administration, Office of Travel Management; Guidance on Including ITS Elements in Transportation Projects; Jan. 2001; pp. 1-20.
Hautespot Networks; HauteCAM HR-IXP-CAM Wireless Router with Integrated Surveillance Cameras; Oct. 24, 2006; pp. 1-4; San Luis Obispo, California.
Cisco Systems; Cisco Metropolitan Mobile Network Solutions; 2004; pp. 1-7; San Jose, California.

* cited by examiner

*Primary Examiner* — Jude Jean Gilles
*Assistant Examiner* — Jaren M Means

(57) ABSTRACT

A wireless communication system comprises an antenna system and a control system. The control system receives operator inputs and transfers control signals indicating a direction. The antenna system receives the control signals, and in response, points a camera to the direction, opens a door to expose the camera, operates the camera to collect video, and transfers the video. The antenna system receives additional control signals, and in response, closes the door to protect the camera from external environmental elements.

18 Claims, 4 Drawing Sheets

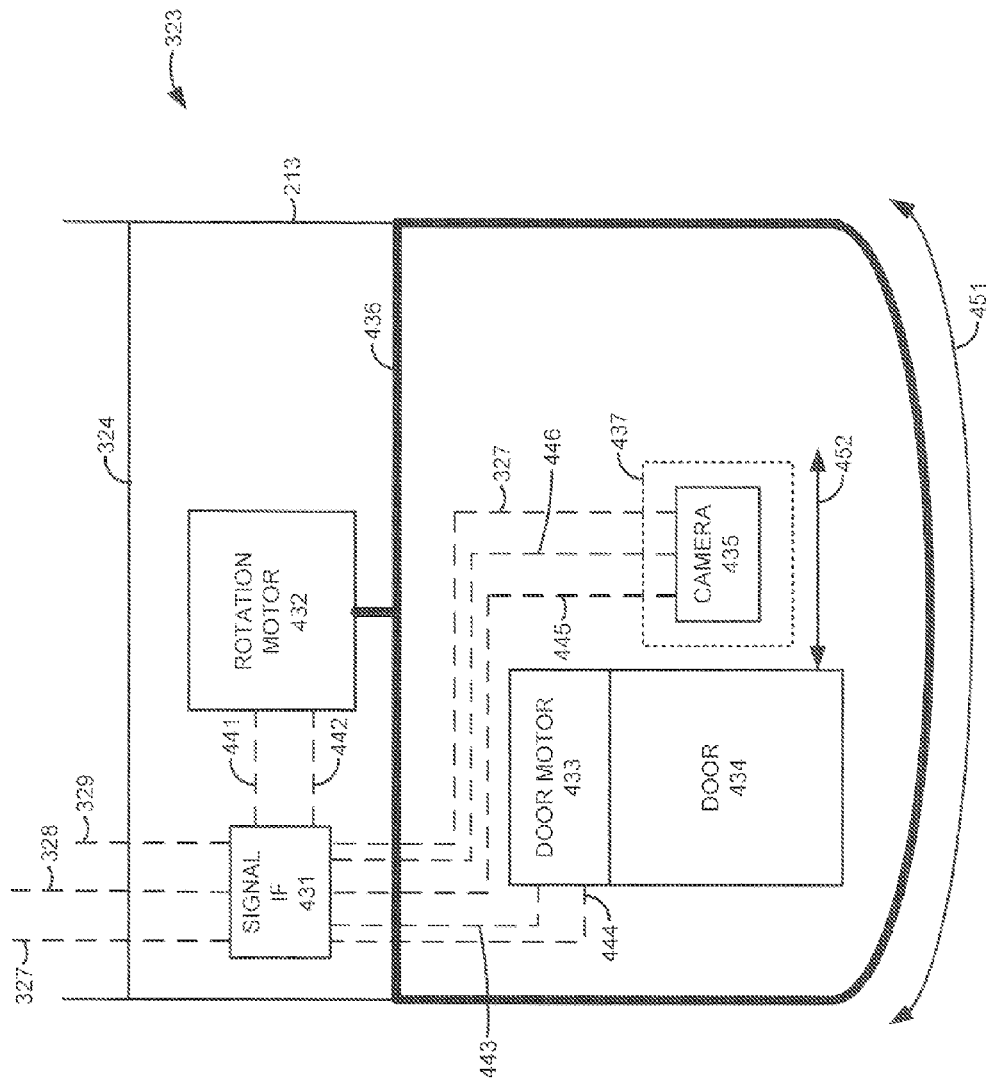

VIDEO COLLECTION FOR A WIRELESS COMMUNICATION SYSTEM

BACKGROUND OF THE INVENTION

1. Field of the Invention

The invention is related to the field of communications, and in particular, to video collection in wireless communication system that integrates a video collection system with a wireless communication antenna system.

2. Description of the Prior Art

Wireless communication systems include antennas that exchange wireless communication signals with user devices over the air. The wireless communication signals transport user communications between the user devices and the antennas. The antennas exchange the user communications with a communication network. The antennas and communication network process the user communications to provide communication services to the user devices.

Video cameras have been mounted on the same towers as the antennas to collect video. These video cameras are typically stand alone systems that are separate from the antennas. The video cameras require separate power and communication links. The video cameras are also exposed to harsh environmental conditions. Unfortunately, there is no effective technique for integrating a video camera with an antenna to share environmental protection and to share power and communications cabling.

SUMMARY OF THE INVENTION

Examples of the invention include wireless communication systems and their methods of operation. Examples of the invention include antenna systems and their methods of operation.

Some examples of the invention include a wireless communication system that comprises an antenna system and a video control system. The antenna system includes a radome that houses an antenna and a camera. The antenna exchanges wireless communication signals with user devices. The video control system receives operator inputs selecting the radome and a direction, and in response, transfers video control signals indicating the selected direction over a communication network to the antenna system. The antenna system receives the video control signals, and in response, rotates a section of the radome to point the camera to the selected direction, opens a door in the section of the radome to expose the camera externally to the radome, operates the camera to collect video at the selected direction, and transfers the video over the communication network to the video control system. The video control system receives and displays the video.

In some examples of the invention, the video control system receives additional operator inputs selecting an additional direction, and in response, transfers additional video control signals indicating the additional direction over the communication network to the antenna system. The antenna system receives the additional video control signals, and in response, rotates the section of the radome to point the camera to the additional direction, operates the camera to collect additional video at the additional direction, and transfers the additional video over the communication network to the video control system. The video control system receives and displays the additional video.

In some examples of the invention, the video control system receives additional operator inputs to stop video collection, and in response, transfers additional video control signals to stop the video collection over the communication network to the antenna system. The antenna system receives the additional video control signals, and in response, stops operating the camera and closes the door to protect the camera from environmental elements external to the radome.

In some examples of the invention, the video control system displays a geographic map of the wireless communication system including the antenna system and receives the operator inputs in response to the geographic map.

In some examples of the invention, the radome includes an environmental barrier between the antenna and the camera.

In some examples of the invention, the antenna system includes a tower having a power cable and the antenna and the camera share power from the power cable.

In some examples of the invention, the antenna system includes a tower having a communication cable and the antenna and the camera share the communication cable.

In some examples of the invention, the wireless communication signals comprise Code Division Multiple Access (CDMA) signals.

In some examples of the invention, the wireless communication signals comprise Worldwide Interoperability Microwave Access (WIMAX) signals.

In some examples of the invention, the antenna system exchanges the wireless communication signals with the user devices to provide Internet access.

BRIEF DESCRIPTION OF THE DRAWINGS

The same reference number represents the same element on all drawings.

FIG. 4 illustrates a video collection system in an example of the invention.

DETAILED DESCRIPTION OF THE PREFERRED EMBODIMENT

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Wireless Communication System

Figure 1:
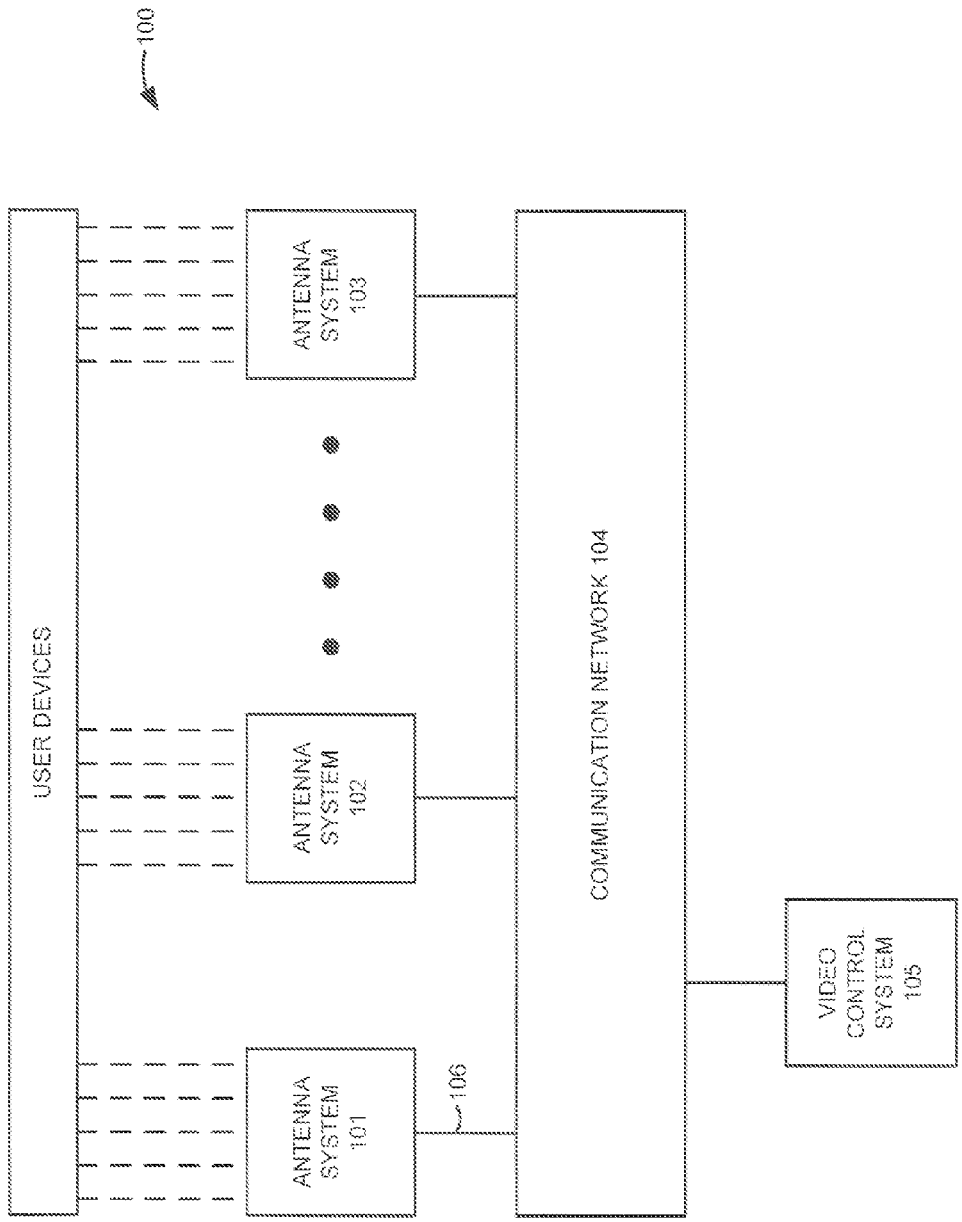
FIG. 1 illustrates a wireless communication system in an example of the invention.

FIG. 1 illustrates wireless communication system 100 in an example of the invention. Wireless communication system 100 includes antenna systems 101-103, communication network 104, and video control system 105. Antenna systems 101-103 could be base stations, wireless hotspots, radio transceivers, or some other system that communicates in a wireless manner over the air. Communication network 104 includes switching systems, gateways, routers, databases, call processors, servers, communication links, or some other type of network elements. Video control system 105 comprises a computer system that is linked to communication network 104.

Antenna systems 101-103 exchange wireless communication signals with user devices over the air. The wireless communication signals use Code Division Multiple Access (CDMA), Global System for Mobile Communications (GSM), Wireless Fidelity (WIFI), Worldwide Interoperability Microwave Access (WIMAX), or some other wireless communication protocol. The wireless communication signals transport user communications between the user devices and antenna systems 101-103.

Antenna systems 101-103 exchange the user communications with communication network 104 over communication links. In particular, antenna system 101 is coupled to communication network 104 over communication link 106. The communication links could use the air (wireless), metallic wires, optical fibers, or some other transport media. These communication links could use CDMA, GSM, WIFI, WIMAX, Time Division Multiplex (TDM), Internet Protocol (IP), Ethernet, Synchronous Optical Network (SONET), Wave Division Multiplexing (WDM), or some other communication protocol. Antenna systems 101-103 and communication network 104 process the user communications to provide telephony, Internet access, media (video/audio) transfer, or some other communication service to the user devices.

Antenna system 101 includes a remotely-controlled door that shelters a camera. Antenna system 101 includes a remotely-controlled motor to point the camera in a desired direction. The desired direction could be specified in any of 360 degrees of azimuth—where 0° is north, 90° is east, 180° is south, and 270° is west. Video control system 104 transfers video control signals to antenna system 101 over communication network 104. In response to the video control signals, antenna system 101 rotates the camera to the selected direction, opens the door, and collects video with the camera. Antenna system 101 transfers the collected video to video control system 105 over communication network 104. Video control system 104 transfers additional video control signals to antenna system 101 over communication network 104. In response to the additional control signals, antenna system 101 stops video collection and closes the door to shelter the camera from external elements. If desired, video control system 105 transfers the video to the user devices over communication network 104 and antenna systems 101-103. If desired, video control system 105 transfers the video to other systems over communication network 104. Antenna systems 102-103 could be configured and operate in a similar manner.

Antenna System

Figure 2:
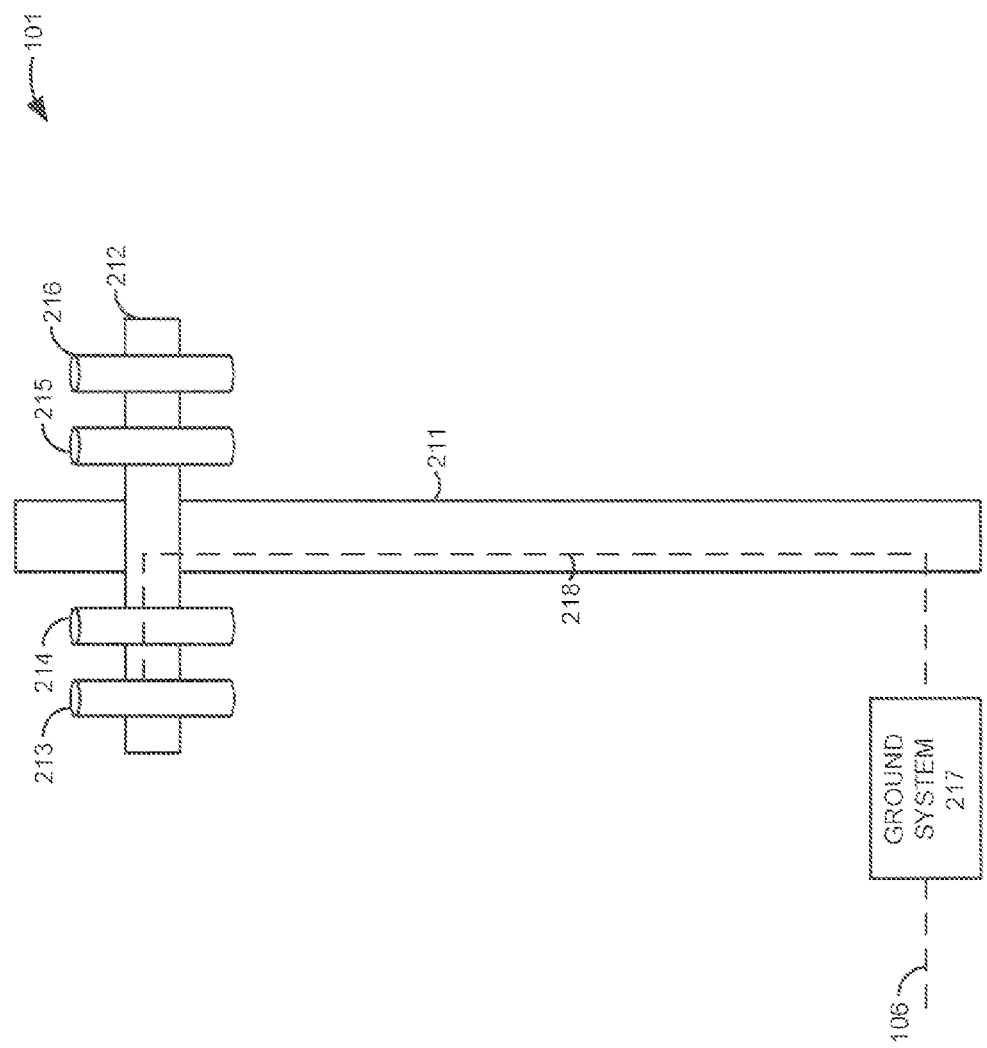
FIG. 2 illustrates an antenna system in an example of the invention.

FIG. 2 illustrates antenna system 101 in an example of the invention. Antenna system 101 includes tower 211, mount 212, radomes 213-216, and ground system 217. Mount 212 is coupled to tower 211 at an elevation above ground. Radomes 213-216 are coupled to mount 212. Tower 211 could be a metal structure, building, or other elevated structure. Mount 212 could be a metal bracket suitable for holding radomes 213-216.

Ground system 217 includes communications equipment and a power supply. Ground system 108 is coupled to communication link 106. Ground system 217 is coupled to radome 213 by links 218. Links 218 transfer user communication signals, power signals, video signals, and control signals between radome 213 and ground system 217.

Radome 213 includes an antenna that exchanges wireless communication signals with user devices over the air. The wireless communication signals transport user communications between the user devices and the antenna. Radome 213 exchanges the user communications with ground system 217 over links 218. Ground system 217 exchanges the user communications with communication network 104 over link 106.

Radome 213 includes a remotely-controlled door that shelters a camera. Radome 213 includes a remotely-controlled motor to point the camera in the desired direction. Ground system 217 receives video control signals over link 106 and transfers the video control signals to radome 213 over links 218. In response to the video control signals, radome 213 rotates the camera to the selected direction, opens the door, and collects video with the camera. Radome 213 transfers the collected video to ground system 217 over links 218. Ground system 217 transfers the collected video to video control system 105 over link 106 and communication network 104.

Ground system 217 receives additional video control signals from video control system 105 over communication network 104 and link 106. Ground system 217 transfers the additional video control signals to radome 213. In response to the additional video control signals, radome 213 stops video collection and closes the door to protect the camera. Radomes 214-216 could be configured and operate in a similar manner.

Links 218 could take many forms. Independent wiring for user communications, power, video, and control could be used. Wireless communications, such as WIFI, could be used for video and video control. Coaxial cables are often used to transfer high-frequency user communications from the ground to the radomes. The video and video control could be transferred on these coaxial cables using lower frequencies. Thus, the antenna and camera in radome 213 could share a communication cable in links 218. Coaxial cables are often used to transfer power from the ground to the radomes to drive the antenna, and power for video collection could be tapped from these coaxial cables. Thus, the antenna and camera in radome 213 could share power from the same power cable in links 218.

Radome

Figure 3:
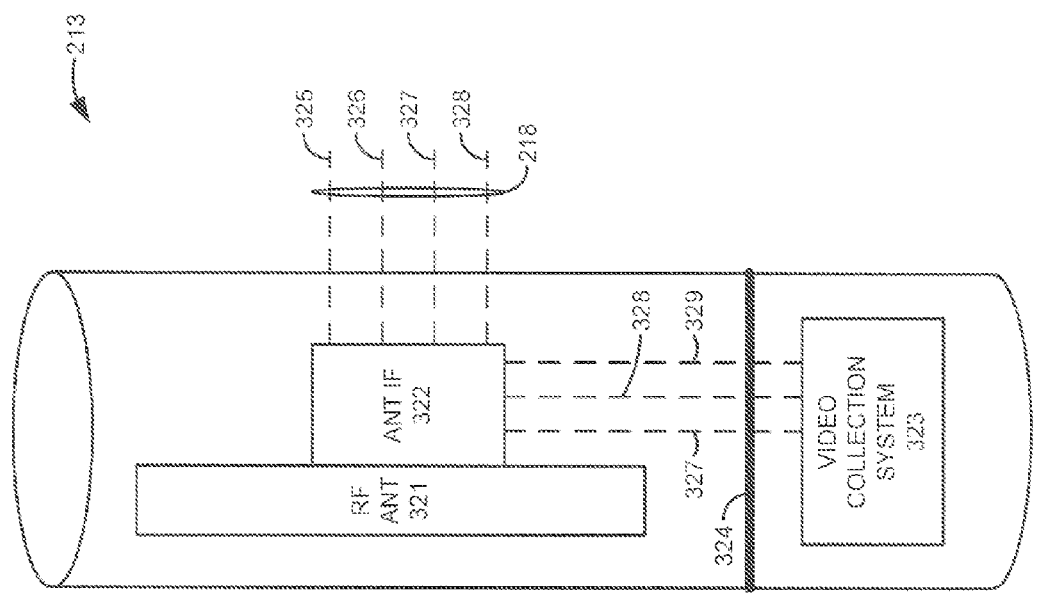
FIG. 3 illustrates a radome in an example of the invention.

FIG. 3 illustrates radome 213 in an example of the invention. Radome 213 includes Radio Frequency (RF) antenna 321, antenna interface 322, video collection system 323, and environmental barrier 324. Antenna interface 322 comprises circuitry that is coupled to links 218 and video collection system 323. Links 218 transfer power signals 325, user communication signals 326, video signals 327, and video control signals 328. Links 218 may transfer other signals as well.

Antenna interface 322 drives RF antenna 321 with power signals 325 and user communication signals 326 to exchange the user communications over the air in wireless communication signals between RF antenna 321 and user devices. Antenna interface 322 derives power signal 329 from power signal 325 and transfers power signal 329 to video collection system 323. Antenna interface 322 receives video control signals 328 from links 218 and transfers video control signals 328 to video collection system 323. Antenna interface 322 receives video signals 327 from video collection system 323 and transfers video signals 327 to links 218. Note that RF antenna 321 and video collection system 323 share power and communication feeds through interface 322. Thus, video collection system 323 may be connected to power and communications capability by simply plugging system 323 into antenna interface 322.

Environmental elements, such as rain and dust, may enter the lower section of radome 213 that houses video collection system 323. Environmental barrier 324 could be a plastic shield or some other suitable material that prevents these environmental elements from propagating into the upper section of radome 213 that houses RF antenna 321 and antenna interface 322. Environmental barrier 324 also allows signals 327-329 to pass between antenna interface 322 and video collection system 323.

Video collection system 323 includes a remotely-controlled door that shelters a camera. Video collection system 323 includes a remotely-controlled motor to point the camera in a desired direction. Video collection system 323 receives video control signals 328 from antenna interface 322. In response to the video control signals 328, video collection system 323 rotates the camera to the selected direction, opens the door, and collects video with the camera. Video collection system 323 transfers the collected video in video signals 327 to antenna interface 322. Video collection system 323 receives additional video control signals 328 from antenna interface 322. In response to the additional video control signals 328, video collection system 323 stops video collection and closes the door to protect the camera.

Radome 213 houses antenna 321, interface 322, and video system 323 to protect them from environmental elements. Radome 213 could be a plastic cylinder that is approximately six feet high and two feet in diameter. Other shapes, sizes, and materials that are suitable to house and protect the antenna, circuitry, and video equipment could also be used. Note that RF antenna 321, interface 322, and video collection system 323 share the same environmental shelter in the form of radome 213. Also note that the installation of video capability can be eased by pre-fabricating radome 213 with video collection system 323, so that the installation of radome 213 to provide wireless communications also installs the video capability.

Video Collection System

FIG. 4 illustrates video collection system 323 in an example of the invention. Video collection system 323 includes signal interface 431, rotation motor 432, door motor 433, door 434, camera 435, and radome section 436. Radome section 436 is a rotatable portion of radome 213 that has a movable seal to radome 213. For example, the seal could use overlapping channels with bearings to allow the rotation of section 436 while maintaining environmental protection from external elements within radome 213. Other suitable techniques for the moveable seal could be used. Radome section 436 is coupled to rotation motor 432. Radome section 436 houses door motor 433, door 434, and camera 435. Radome section 436 has an orifice 437 that allows camera 435 to collect video externally to radome 213 through orifice 437.

Signal interface 431 comprises power and processing circuitry. Signal interface 431 receives and processes power signal 329 to derive power signals 441, 443, and 445. Signal interface 431 transfers power signal 441 to rotation motor 432. Signal interface 431 transfers power signal 443 to door motor 433. Signal interface 431 transfers power signal 445 to camera 435. Signal interface 431 receives and processes video control signals 328 to transfer control signals 442, 444, and 446. Signal interface 431 transfers control signal 442 to rotation motor 432. Signal interface 431 transfers control signal 444 to door motor 433. Signal interface 431 transfers control signal 446 to camera 435.

In response to control signals 442, rotation motor rotates radome section 436 to point camera 435 in the desired direction (as indicated by arrow 451). In response to control signals 444, door motor 433 moves door 434 to expose orifice 437 (as indicated by arrow 452), and thus, exposes camera 435 to the desired direction. In response to control signals 446, camera 435 collects video and transfers the collected video to signal interface 431 in video signal 327. Signal interface 431 transfers video signal 327 to antenna interface 322.

In response to additional control signals 446, camera 435 stops collecting video. In response to additional control signals 444, door motor 433 moves door 434 to cover orifice 437 (as indicated by arrow 452), and thus, protects camera 435 from external environmental elements.

In some examples, camera 435 includes an internal motor to point the camera lens as directed by control signals 446. The internal motor may point the lens in both azimuth and elevation, so the directional azimuth and elevation angle from which video is collected can be remotely adjusted by video control system 105.

Video Control System

Video control system 105 comprises a computer system configured to operate as describe herein. Video control system 105 displays a geographic map of wireless communication system 100. The system operator selects one of the antenna systems from the map. Video control system 105 then displays a higher resolution map including the selected antenna system and showing radomes on the antenna system that have video collection capability. The system operator selects one of the radomes from the map. The system operator selects a direction for video collection. The operator could indicate the direction on the map or enter the direction in some other manner.

The system operator then indicates that video collection should start, and in response, video control system 105 sends corresponding video control signals to the selected radome over communication network 104. In response to the video control signals, the selected radome rotates the camera to the selected direction, opens the door to expose the camera, and collects video. The radome transfers the collected video back to video control system 105 over communication network 104. Video control system 105 stores the video and displays the video to the system operator.

The system operator may indicate an additional direction for video collection, and additional video control signals are sent to the radome. In response to these video control signals, the radome rotates the camera to the additional direction. Thus, the system operator may specify two directions to obtain a video sweep of an area between the two directions. In addition, the operator may input instructions to point the camera lens to a direction or elevation, and additional video control signals are sent to the radome. In response to these video control signals, the camera points its lens to the specified direction or elevation.

When video collection is finished, the system operator indicates that video collection should stop, and in response, video control system 105 sends corresponding video control signals to the selected radome over communication network 104. In response to the video control signals, the selected radome stops the camera and closes the door to protect the camera from environmental elements.

Advantages

The video collection system described above can be mounted on the same tower as a wireless communication antenna. Advantageously, the video collection system is integrated with the antenna and is not a separate stand alone system. The video collection system can share power and communication links with the antenna. The video collection system also shares environmental protection with the antenna to protect its video equipment from exposure to harsh environmental conditions. If desired, the video collection system can be pre-fabricated into the radome that houses the antenna to ease the installation of video capability at the antenna site.

The invention claimed is:

1. A wireless communication system comprising:
    an antenna system including a radome that houses an antenna and a camera, wherein the antenna is configured to exchange wireless communication signals with user devices;

a video control system configured to display a geographic map of the wireless communication system including the antenna system, in response to the geographic map, receive operator inputs selecting the radome and a direction, and in response to the operator inputs, transfer video control signals indicating the selected direction over a communication network to the antenna system;

the antenna system is configured to receive the video control signals, and in response, rotate a section of the radome to point the camera to the selected direction, open a door in the section of the radome to expose the camera externally to the radome, operate the camera to collect video at the selected direction, and transfer the video over the communication network to the video control system; and the video control system is further configured to receive and display the video.

2. The wireless communication system of claim 1 wherein:
the video control system is configured to receive additional operator inputs selecting an additional direction, and in response, transfer additional video control signals indicating the additional direction over the communication network to the antenna system;
the antenna system is configured to receive the additional video control signals, and in response, rotate the section of the radome to point the camera to the additional direction, operate the camera to collect additional video at the additional direction, and transfer the additional video over the communication network to the video control system; and
the video control system is further configured to receive and display the additional video.

3. The wireless communication system of claim 1 wherein:
the video control system is configured to receive additional operator inputs to stop video collection, and in response, transfer additional video control signals to stop the video collection over the communication network to the antenna system; and
the antenna system is configured to receive the additional video control signals, and in response, stop operating the camera and close the door to protect the camera from environmental elements external to the radome.

4. The wireless communication system of claim 1 wherein the radome includes an environmental barrier between the antenna and the camera.

5. The wireless communication system of claim 1 wherein the antenna system includes a tower having a power cable and the antenna and the camera share power from the power cable.

6. The wireless communication system of claim 1 wherein the antenna system includes a tower having a communication cable and the antenna and the camera share the communication cable.

7. The wireless communication system of claim 1 wherein the wireless communication signals comprise Code Division Multiple Access (CDMA) signals.

8. The wireless communication system of claim 1 wherein the wireless communication signals comprise Worldwide Interoperability Microwave Access (WIMAX) signals.

9. The wireless communication system of claim 1 wherein the antenna system is configured to exchange the wireless communication signals with the user devices to provide Internet access.

10. A method of operating a wireless communication system having a video control system, a communication network, and an antenna system including a radome that houses an antenna and a camera, the method comprising:

operating the antenna to exchange wireless communication signals with user devices;

in the video control system, displaying a geographic map of the wireless communication system including the antenna system, in response to the geographic map, receiving operator inputs selecting the radome and a direction, and in response to the operator inputs, transferring video control signals indicating the selected direction over the communication network to the antenna system;

in the antenna system, receiving the video control signals, and in response, rotating a section of the radome to point the camera to the selected direction, opening a door in the section of the radome to expose the camera externally to the radome, operating the camera to collect video at the selected direction, and transferring the video over the communication network to the video control system; and in the video control system, receiving and displaying the video.

11. The method of claim 10 further comprising:
in the video control system, receiving additional operator inputs selecting an additional direction, and in response, transferring additional video control signals indicating the additional direction over the communication network to the antenna system;
in the antenna system, receiving the additional video control signals, and in response, rotating the section of the radome to point the camera to the additional direction, operating the camera to collect additional video at the additional direction, and transferring the additional video over the communication network to the video control system; and
in the video control system, receiving and displaying the additional video.

12. The method of claim 10 further comprising:
in the video control system, receiving additional operator inputs to stop video collection, and in response, transferring additional video control signals to stop the video collection over the communication network to the antenna system; and
in the antenna system, receiving the additional video control signals, and in response, stopping operation of the camera and closing the door to protect the camera from environmental elements external to the radome.

13. The method of claim 10 wherein the radome includes an environmental barrier between the antenna and the camera.

14. The method of claim 10 wherein the antenna system includes a tower having a power cable and the antenna and the camera share power from the power cable.

15. The method of claim 10 wherein the antenna system includes a tower having a communication cable and the antenna and the camera share the communication cable.

16. The method of claim 10 wherein the wireless communication signals comprise Code Division Multiple Access (CDMA) signals.

17. The method of claim 10 wherein the wireless communication signals comprise Worldwide Interoperability Microwave Access (WIMAX) signals.

18. The method of claim 10 wherein exchanging the wireless communication signals with the user devices comprises providing Internet access.

* * * * *